J. G. Borden.
Soldering Mach.

N°. 95,418. Patented Oct. 5, 1869.

Witnesses;
Chas. Nida
W. F. Clark

Inventor;
J. G. Borden
per Munn & Co.

United States Patent Office.

JOHN G. BORDEN, OF BREWSTER STATION, NEW YORK.

Letters Patent No. 95,418, dated October 5, 1869.

IMPROVEMENT IN MACHINES FOR SOLDERING TIN CANS.

The Schedule referred to in these Letters Patent and making part of the same.

*To all whom it may concern:*

Be it known that I, JOHN G. BORDEN, of Brewster Station, in the county of Putnam, and State of New York, have invented a new and improved Soldering-Machine; and I do hereby declare that the following is a full, clear, and exact description thereof, which will enable those skilled in the art to make and use the same, reference being had to the accompanying drawings, forming part of this specification.

This invention relates to new and useful improvements in a machine for soldering tin cans and other articles of tinware, and consists in soldering the joint by revolving the corner of the can or other article in a reservoir of melted solder, in contact with a soldering-iron, and with solder on the inside of the cans or other article, which solder is melted by the heat imparted by the soldering-iron, the result being the meeting of the melted solder (in the joint) from both the inside and outside, thus insuring a perfect joint, the arrangement and operation being as hereinafter more fully described.

In the accompanying plate of drawings—

Similar letters of reference indicate corresponding parts.

Figure 1:
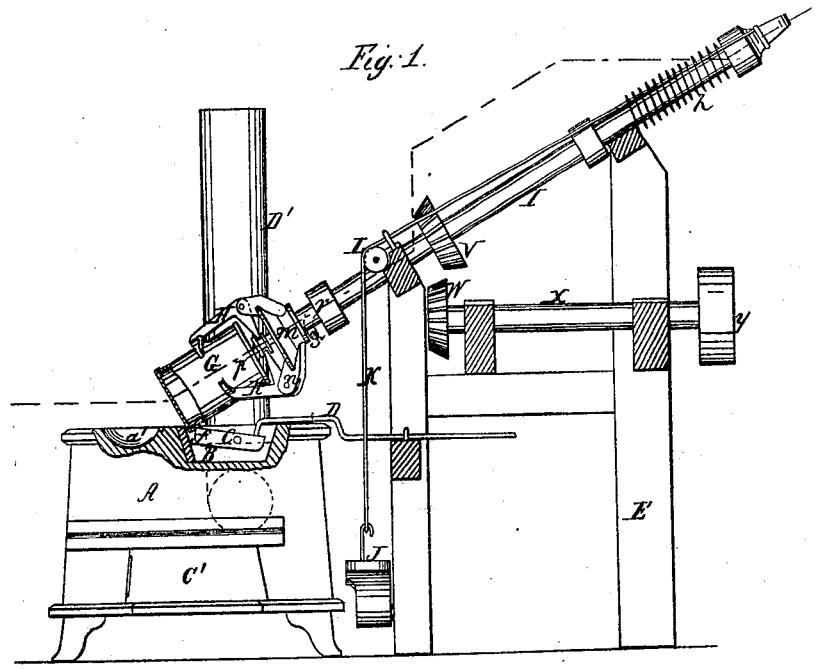
Figure 1 represents a sectional side elevation of the machine, the section being through the line *x x* of fig. 2.

A is the stove, in the top of which is the reservoir B, in which the solder is melted.

C is the soldering-"iron," which is made of copper, or of any other suitable metal.

This "iron" is attached to the rod D, which extends back, and is secured to the frame E, as seen in the drawing.

Figure 2:
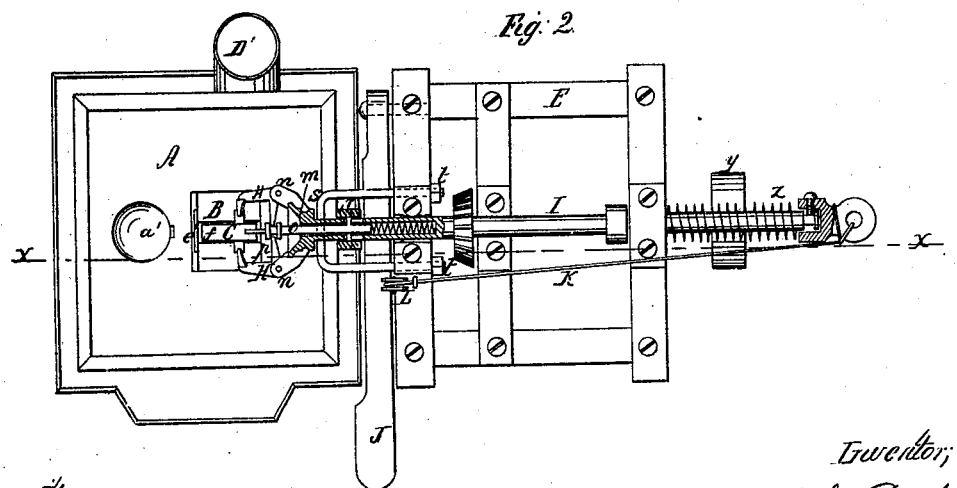
Figure 2 is a top or plan view.

There is a cavity in the solder-reservoir B, which receives the iron C, and the "iron" rests on pivots, on the bottom of the reservoir, as seen in fig. 2, so that the iron acts as a lever, whose fulcra are the pivots, and the resistance the rod D, which springs when a weight or pressure is applied to the long end at *f*.

For general work the iron C is sufficient, but if desirable for heavy work, side irons, similarly arranged or working laterally, are to be employed.

G represents a tin can, which, in soldering, is grasped by the fingers of the bent levers H.

I is a shaft, supported in an inclined position by the frame E, in suitable boxes.

This shaft revolves, and is also given a longitudinal motion by means of foot-treadle J, which is connected with the outer end of the shaft by the cord K, as seen in fig. 2.

This cord passes over a pulley, L, on the frame, so that a downward motion of the treadle forces the shaft downward toward the stove.

The lower end of the shaft is tubular, and on its extreme end there is a collar, *m*, provided with forked or slotted lugs, for receiving the bent lever or bell-cranks H, the fulcra of which levers are at the point *n*.

In the tubular end of the shaft I there is a rod, O, with a grooved collar, *p*, upon its end.

There is a pin through this rod, which works in a slot in the shaft I, and at its back end there is a spiral spring, *q*, which bears against the end of the rod with a constant pressure.

The pin through the rod passes through the shaft on each side, and enters a loose collar, *r*.

S is a staple, which is fast in the frame, as seen at *t t*. This acts as a stop to the downward movement of the collar *r* and rod *o*.

The inner ends of the bent levers H enter the groove in the collar *p*, on the end of the rod *o*, so that when, by a longitudinal movement of the shaft I, the collar *r* and rod *o* are stopped by the staple *s*, the fingers of the bent levers H are thrown forward to the centre, by the continued movement of the shaft.

The longitudinal movement of the shaft ceases when the fingers *u* firmly grasp the can.

At the time the can is thus grasped, the gear-wheel V, on the shaft I, is carried down and engages with the gear-wheel W, on the horizontal shaft X.

This shaft X is in constant motion, by means of a belt on the pulley *y*, or it may be revolved by hand, by means of a crank.

The can is held in the position seen in the drawing, sufficiently long to give the corner one or more revolutions in the melted solder contained in the reservoir B. A sufficient quantity of solder is placed in the can, which is melted by the contact of the can with the soldering-iron C.

The elasticity given the iron by means of the rod D allows it to keep in close with the can, notwithstanding any inequalities of surface which may occur.

The solder taken up by the corner of the can from the reservoir, and the solder which is melted inside the can, meet and form a perfectly tight joint.

When the can has been given a full revolution (or more) in this position, the pressure is removed from the treadle J, when the shaft I is thrown back to its normal condition by the spiral spring I, and is ready for another operation. As represented in the drawing, the can is in position, but the shaft has not yet received its longitudinal movement by pressing upon the treadle.

*a'* is a cavity for collecting any loose solder which may drop from the can during the process, which solder is ladled back into the reservoir.

At the front edge of the reservoir there is a copper or other metallic block, for the end of the can to strike and rotate against, which block transmits the heat to the can, there materially assisting in fusing or melting the solder on and outside, which block $e$, as seen at $e'$, (fig. 2,) receives the end of the can, the shoulders of which recess or block also serve to wipe the surplus solder from the joint.

$c'$ is the door, for introducing fuel into the stove.

$D'$ is the smoke-pipe or flue.

With this machine the services of skilled workmen are not required for soldering. The operation may be performed by boys in the most perfect manner, and with great rapidity.

Having thus described my invention,

What I claim as new, and desire to secure by Letters Patent, is—

1. In combination with the heating-stove A and the reservoir B, the pivoted soldering-iron C and rod D, all arranged and operating substantially as described.

2. The bent levers H, grooved collar $p$, or its equivalent, the collar $m$, the rod $o$, and the collar $r$, combined, arranged, and operating substantially as described.

3. In combination with the mechanism described, for holding and revolving the can or other article to be soldered, the soldering-iron C, whereby solder is melted on the inside of the can, substantially as described.

JOHN G. BORDEN.

Witnesses:
    AVERY S. BRUSH,
    WALTER POWER.